US009063979B2

(12) United States Patent
Chiu et al.

(10) Patent No.: US 9,063,979 B2
(45) Date of Patent: Jun. 23, 2015

(54) ANALYZING EVENT STREAMS OF USER SESSIONS

(75) Inventors: Chi-Hsien Chiu, Milpitas, CA (US);
Raghav Gupta, Sunnyvale, CA (US);
Neelakantan Sundaresan, Mountain View, CA (US)

(73) Assignee: eBay, Inc., San Jose, CA (US)

( * ) Notice: Subject to any disclaimer, the term of this patent is extended or adjusted under 35 U.S.C. 154(b) by 548 days.

(21) Appl. No.: 12/263,382

(22) Filed: Oct. 31, 2008

(65) Prior Publication Data

US 2009/0228474 A1    Sep. 10, 2009

Related U.S. Application Data

(60) Provisional application No. 60/984,671, filed on Nov. 1, 2007.

(51) Int. Cl.
*G06F 17/30* (2006.01)

(52) U.S. Cl.
CPC .... *G06F 17/30516* (2013.01); *G06F 17/30554* (2013.01); *G06F 17/3089* (2013.01); *G06F 17/30958* (2013.01)

(58) Field of Classification Search
CPC ............... G06F 17/30516; G06F 17/30958; G06F 17/3089; G06F 17/30554
USPC ......... 707/999.005, 999.006, 999.007, 999.1, 707/E17.015
See application file for complete search history.

(56) References Cited

U.S. PATENT DOCUMENTS

| | | | | |
|---|---|---|---|---|
| 6,021,403 A * | 2/2000 | Horvitz et al. | ................... | 706/45 |
| 7,051,029 B1 * | 5/2006 | Fayyad et al. | ......................... | 1/1 |
| 2004/0003042 A1 * | 1/2004 | Horvitz et al. | ................. | 709/204 |
| 2005/0038888 A1 * | 2/2005 | Labertz | ......................... | 709/224 |
| 2006/0265406 A1 * | 11/2006 | Chkodrov et al. | ............ | 707/100 |

OTHER PUBLICATIONS

David M. Hilbert and David F. Redmiles , "Extracting Usability Information from User Interface Events", ACM Computing survey, vol. 32, No. 4, Dec. 2000, pp. 384-421.*
Ed H. Chi, "Improving Web Usability Through Visualization", IEEE Internet Computing, Mar./Apr. 2002, pp. 64-71.*

* cited by examiner

*Primary Examiner* — Shiow-Jy Fan
(74) *Attorney, Agent, or Firm* — Schwegman Lundberg & Woessner, P.A.

(57) ABSTRACT

In various exemplary embodiments, a system and method is disclosed to analyze event streams of a user session. One embodiment of the method includes logging a plurality of events from an event stream, specifying conditions to sort the plurality of events, applying the conditions to the plurality of events, producing a probability distribution of event nodes after a given node in the event stream, and producing an interactive graphical reduction of a produced graph by determining patterns in a graphical tree and unifying occurrences of the patterns.

26 Claims, 12 Drawing Sheets

ANALYZING EVENT STREAMS OF USER SESSIONS

CROSS-REFERENCE TO RELATED APPLICATIONS

This application claims priority benefit of U.S. Provisional Application No. 60/984,671, entitled, "Analyzing Event Streams of User Sessions," filed Nov. 1, 2007, which is hereby incorporated by reference in its entirety.

COPYRIGHT NOTICE

A portion of the disclosure of this patent document contains material that may be subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2007, eBay® Inc. All Rights Reserved.

TECHNICAL FIELD

The present application relates generally to the field of computer technology; and, in a specific exemplary embodiment, to a method of producing reduced visualization automatons of user session data.

BACKGROUND

Session log analysis has been used extensively in applications to study what users do (or how they interact with an application) on, for example, a website. This user behavioral information in turn may be used as a proxy to understand what the users might want, which in turn, may be used to evaluate features on the site. In large scale applications where the entry points for the users may be varied, the activities they participate in, the number of states even a single session can result in, and the cross-session relationship between events can be complex. Operators of Web-based applications may also constantly be conducting multi-variate tests on features and variants of user interfaces. Creating easily understandable and concise reports may be important; however, the reports may be expensive and time consuming.

BRIEF DESCRIPTION OF THE DRAWINGS

Various ones of the appended drawings merely illustrate exemplary embodiments of the present disclosure and must not be considered as limiting its scope.

DETAILED DESCRIPTION

Figure 1:
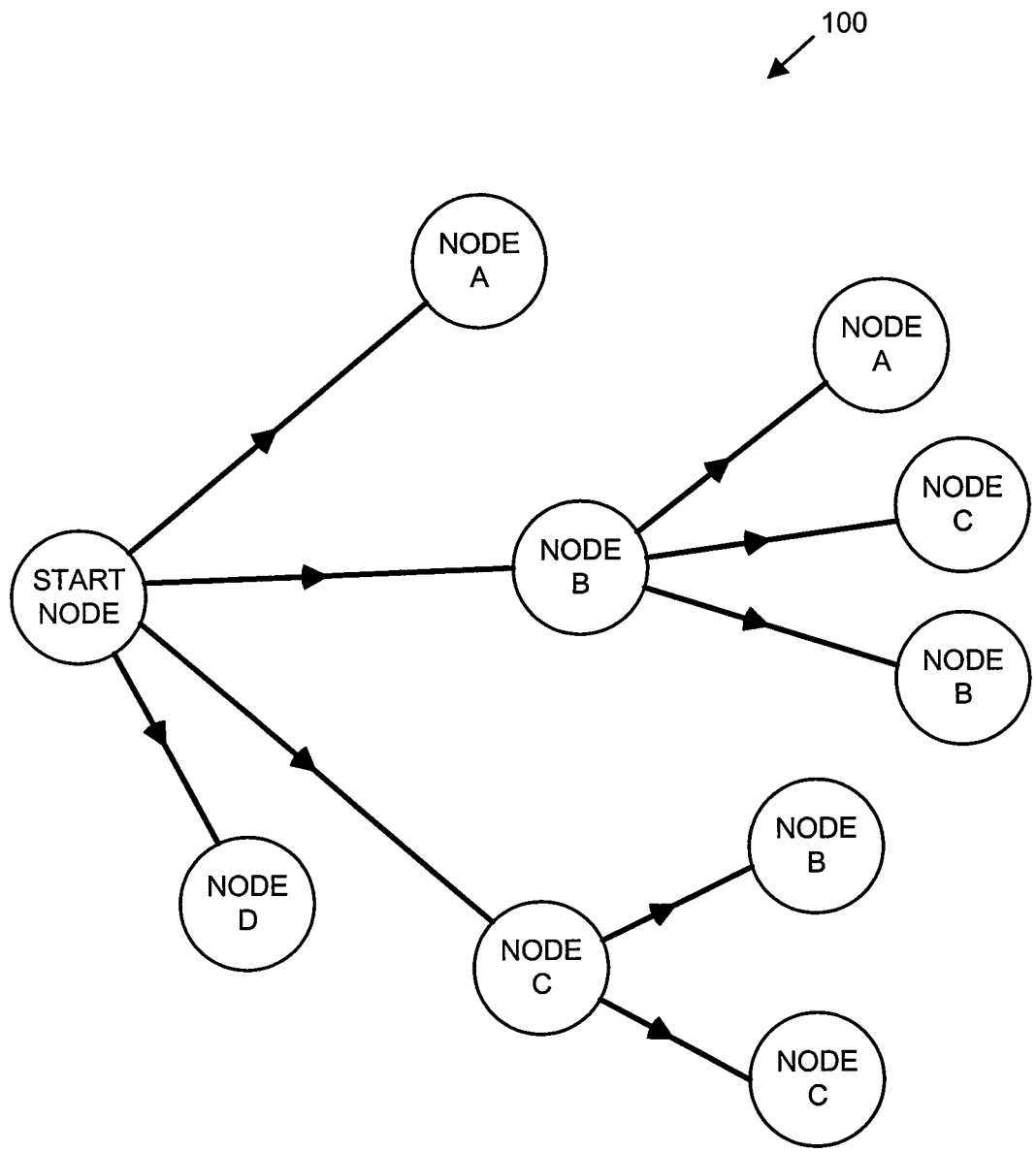
FIG. 1 is an exemplary embodiment of a simplified forward-looking graph.

In the following description, for purposes of explanation, numerous specific details may be set forth in order to provide a thorough understanding of some exemplary embodiments. It will be evident, however, to one skilled in the art that the present disclosure may be practiced without these specific details.

As used herein, the term "or" may be construed in either an inclusive or exclusive sense. Similarly, the term "exemplary" is construed merely to mean an example of something or an exemplar and not necessarily a preferred or ideal means of accomplishing a goal.

In an exemplary embodiment, a system and method allow an analyst to visually specify constraints and query an input stream of user session logs to obtain a visually understandable, clickable, and interactive map of a report generated from the query. With this goal in mind, a visual reporting system is described herein in various exemplary embodiments. A system architecture, a query language, and a graphical reduction and user interface system are described. The graph produced may be based upon a Probabilistic Finite-State Automaton (PFA). Alternatively, it may be a Prefix Tree Automaton (PTA). An efficient exemplary mechanism to reduce the automaton into a reduced Probabilistic Finite-State Automaton is described.

Mapping the Mind as a Probabilistic Automaton

In a user session, the user can be in one of any possible number of states. The first entry into a system may be considered the start state. The state following the last state may be considered to be the final state. The final state may be the "exit" state of the user. An exemplary embodiment seeks to model state transitions of a typical user between these two states. By looking at large volumes of user session logs, a state diagram may be constructed where probabilities may be attached to transitions coming from a state. Such user sessions may be considered a stochastic process that may be modeled as a discrete-time stochastic process. Also, an assumption may be made that the user session has at least one Markov property and may thus be modeled as a Markov Chain. The language underlying this automaton may be a stochastic language. Same exemplary embodiments seek to determine this stochastic language for a set of log streams processed with a set of front-end filters.

A Probabilistic Finite-State Automaton (PFA) may be a non-deterministic Finite-State automaton, where state transitions have attached probabilities. A probabilistic automaton may be an extension of a Non-deterministic Finite-State Automaton (NFA) along with two probabilities: (1) a probability P of a particular state transition taking place; and with (2) the initial state replaced by a stochastic vector of the automaton being in the given initial state. Thus a PFA may be defined by a 6-tuple (Q, Σ, T, $q_0$, F, P), where Q may be a finite set of states, Σ may be a finite set of symbols, T may be a transition function T: $Q\Sigma \rightarrow 2^Q$, $q_0$ may be a start state, and F may be a set of final states.

The transition function T can be expressed as a matrix of the form T: $Q\Sigma \cdot Q \rightarrow \{0, 1\}$ where if there may be a transition T(q, a, q')=1 if q' may be in T(q, a) and 0 otherwise. Then, the PFA replaces this expression by a stochastic matrix of the form [Pa]qq' where the values in the matrix may be between 0 and 1 and Σq'[Pa]qq'=1. The initial state of a probabilistic automaton may be given by a row vector v, such that Σq[v] q=1. A Probabilistic Deterministic Finite-State Automaton (PDFA) may be a PFA that may be a deterministic automaton.

A Prefix Tree Automaton (PTA) may be an automaton defined over a subset I+ of Σ+ that may be the set of strings belonging to a probabilistic language being modeled. A Prefix Tree Acceptor/Automaton accepts only strings in I+ and in which the common strings may be merged together into a tree-shaped automaton. Stochastic models that assign a probability to a tree may be useful, for instance, in natural language processing.

Here, a frontier-to-tree automaton processes the tree bottom-up and state may be computed for every sub-tree. A result depends on both the node label and the state obtained after the node sub-trees. Therefore a transition function, one for each possible number of sub-trees, may be required. The probabilistic extension now defines a probability distribution over the set of labeled trees. A Probabilistic Prefix Tree Automaton (PPTA) over I+, denoted by PPTA(I+), may be a probabilistic extension on a PTA(I+) in which each transition has a probability proportional to the number of times it may be used while generating I+.

Some inference methods for Probabilistic Automata exist. For example, various types of prior art software may be used where states may be merged based upon a probability of their suffixes being the same within a threshold. Limitations with these software types are detailed below. In a specific exemplary embodiment, a generalization of the inferred PDFA may be controlled by this threshold.

Exemplary Processing System

In an overview of a user session log exemplary processing system, a logging framework listens to real-time user activity and creates and organizes the user activities as logs. The logs may be processed by an analysis framework, described in detail below, allowing aggregate graphs to be created from the logs. The aggregate graphs provide a visually navigable graphical overview of the analysis.

Logging Framework

An exemplary embodiment of a logging framework has a custom mechanism to listen to real-time user events on a communication network (e.g., over the Internet or on a distributed system such as a peer-to-peer network). In a specific exemplary embodiment, the real-time user events could be occurring in communications with a website such as eBay®.

On the client side, the logging framework ensures tagging of each user's activity uniquely. On the server side, the logging framework provides a highly flexible mechanism for log data collection, varying from massively distributed systems to highly centralized systems. The entire live log data stream may be separated into multiple channels based upon a hash of the session-ID, and streamed onto a single network pipe. Authenticated "listeners" with a physical connection to the network pipe can then choose to tap into a specific percentage of global traffic, and either persist all of the data or perform live analytical operations.

One feature may be that regardless of percentage chosen, the stream will always be "session-complete." This means that if, for example, a 10% sample may be tapped into, a result will be a stream consisting of 100% of the log events (from start state to exit state) generated by 10% of all sessions, and not vice-versa. The high percentage of log events produces a benefit by creating better quality and precise reports without incomplete sessions in them.

The logs may be compressed files. Each line in the log may be called an event, each event may be composed of several segments, with each of the segments composed of one or more elements. For example, SessionID (a random generated unique ID for identifying sessions), PageName (an ID represents a page or a service daemon), and TimeStamp may be elements of the FIELD segment, and QUERY_STRING and CATEGORY_ID may be elements of the TAG segment. Events may be grouped by SessionID and then further sorted by TimeStamp. A session may be a group of events with, for example, the following conditions: a new session begins when (1) the difference of the timestamp of two continuous events in a same SessionID may be larger than 30 minutes, or (2) the SessionID of two continuous events may be different. The system may be designed for visualizing the activities occurring in a session.

Visualization Framework

As noted above, the system may obtain a certain percentage of the overall user session log stream. Although these data may be used for various purposes, embodiments of the present disclosure enable an analyst to easily visualize usage patterns of various pages on a website site in a concise and intuitive manner. An exemplary embodiment of a visual system is described in detail below.

Exemplary goals of the visual framework include enabling a user to visually understand large volumes of complex data using only, for example, a web browser. In an exemplary embodiment, the user can specify criteria for analyzing and aggregating user session activity data over a certain date range and create a report to be generated. Results may then be presented in the browser itself as an interactive graph.

Referring now to FIG. 1, an exemplary embodiment of a simplified forward-looking graph 100 depicts a typical tree structure with the entire tree rooted at a "Start Node." In one rendering, each node in the graph may be a specific page type with edges between nodes containing a percentage (not shown) of aggregated user transitions from node A (e.g., page type A) to node B (e.g., page type B) in a given time range. The Start Node depicts a start of the user session for all sessions, and an "end node" (not shown directly but may be represented by any one or more of the nodes on the far right) depicts an end of the user session. The user's navigation behavior (e.g., pages the user visited in a time series) tends to have a common prefix with separation in the tails or leaves. Hence, the graph looks like a tree. When performing a visualization, common prefixes may be merged together. The merger concept, along with forward-looking and other tree structures, is described in more detail with regard to FIGS. 3 and 4, below.

System Architecture

Various embodiments of the present disclosure may be designed as a system used for quick visual discovery of usage paths and patterns from session data. In various exemplary embodiments, event logs may be automatically cleaned for robot events (i.e., those events not entered by a human end-user but rather, an automated event). Events may be further grouped into user sessions sorted by timestamp. The system provides a facility for applying front-end filters to the data. Front end filters may be used to include only sessions that meet initial conditions. Initial conditions may include traffic driver entry points, or query conditions (e.g., users who search for antiques or cars on eBay®). Given the volume of data, this could be time-consuming process. (In a particular test context, it may be several hours' or several days' worth of session data).

Figure 2:
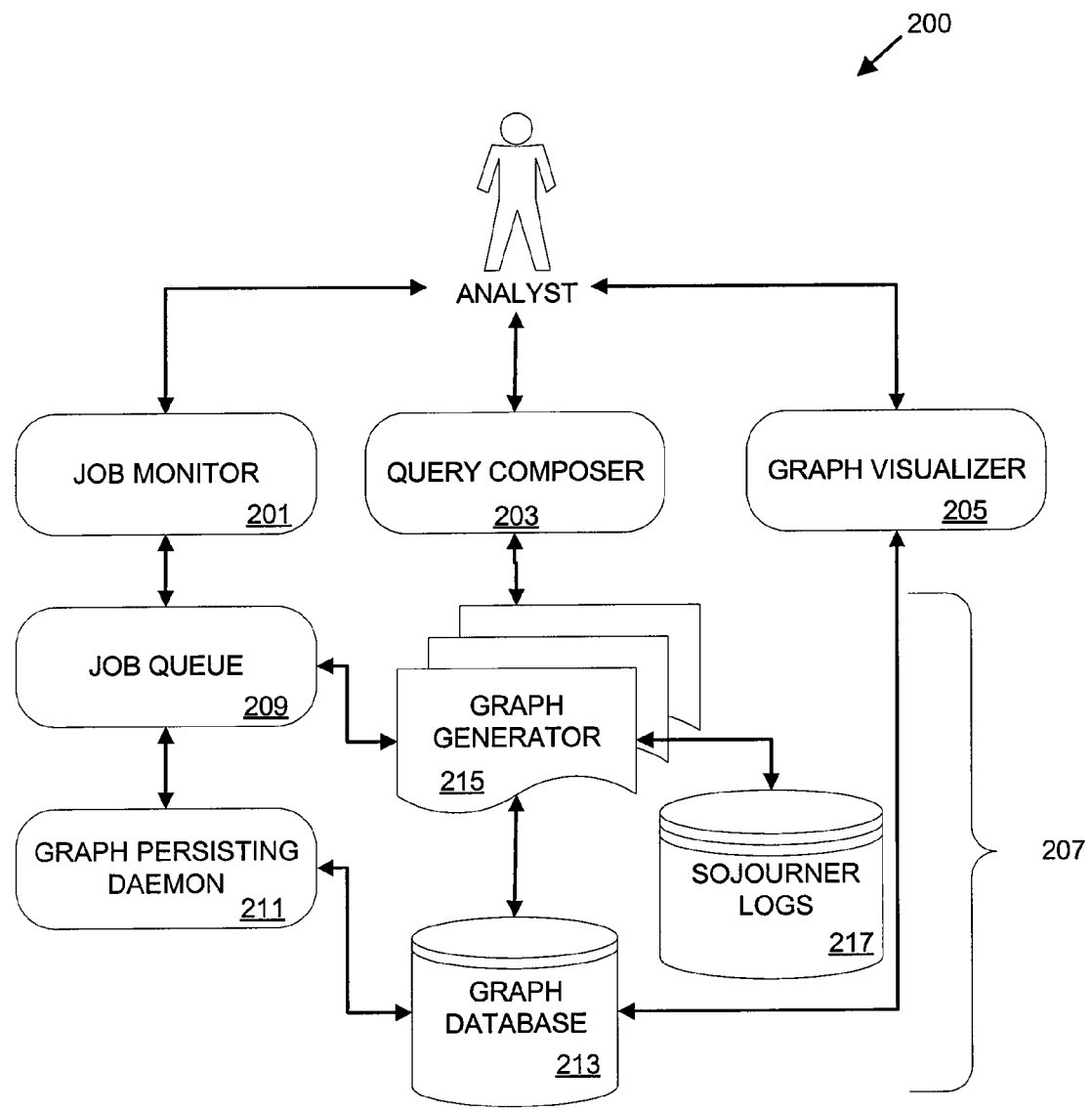
FIG. 2 is a schematic of an exemplary embodiment of a processing system of the present disclosure.

With reference to FIG. 2, an exemplary embodiment of the system architecture 200 includes three types of user interface components: a job monitor 201, a query composer 203, and a graph visualizer 205. The job monitor 201 may be used to check a current status of a submitted job, or manage running jobs. The job monitor 201 performs its function by interfacing with a plurality of backend components 207. The plurality of backend components 207 create graphs from logs and manage archiving for future visualizations. For example, the job monitor 201 receives a job status from the job queue 209. The job queue 209 is updated by the graph persisting daemon 211 that continually monitors jobs in the job queue 209. Once the graph persisting daemon 211 finds a job, the job may be marked as "created." The graph persisting daemon 211 reads a generated graph file and then stores it into a graph database 213.

While the exemplary system architecture 200 may be used to provide visual analysis for session data, it has been designed to aid in analysis of any time series data. The graph persisting daemon 211 can store any time series into the graph database 213 as long as a format of an input file is defined (each line may be a time series followed by the occurred times). Since the graph visualizer 205 reads time series data from the graph database 213, the system architecture 200 may generalize to any time series data set.

The graph visualizer 205 aids in graph visualization and, in a specific exemplary embodiment, provides an interactive interface to allow analysts to explore user traversal paths. The user traversal paths may be represented in at least two automaton formats such as PPTA and PDFA. The analyst can expand or collapse a node so that the next step of a node will be shown or hidden. Also, the user can adjust a probability threshold, discussed in more detail below, allowing user activity to be seen at a finer or coarser level. A more detailed discussion of the visualization function is given below.

The query composer 203 composes graph queries thus constructing and utilizing a Mobius Query Language (MQL), discussed in more detail, below. The MQL defines a front-end filter to be applied to the log data. For example, if the analyst wants to know what the users did prior to making a bid in eBay® US, the graph queries could include "at least one make bid event in a session and happened in eBay® US between Jan. 1, 2007 and Jan. 7, 2007." The query composer 203 provides a friendly user-interface allowing analysts to type conditions and generate a MQL. The MQL may be validated and then sent to a graph generator 215 to generate graphs.

In an exemplary embodiment, the graph generator 215 applies the MQL to the logs to generate a graph file as an output. The graph file may be, for example, a plain text file, and each line in the file may be a page name sequence followed by an integer, specifying times of the path occurred in a given analysis. The process to generate a graph file may be both CPU and I/O intensive (not shown) as event log files may be extremely large with the query processing involving a scan of the large files. In a specific exemplary embodiment, opportunities for parallelizing may exist. Thus, the graph generator 215 may be employed in a MapReduce environment. MapReduce is produced by Google, Inc. (Mountain View, Calif., USA) and known independently in the art. MapReduce is a programming model and an associated implementation for processing and generating large data sets. If the system architecture 200 is run in a Java environment, an open source implementation of MapReduce, referred to as Hadoop, may be used as well. Hadoop is produced by Apache Software Foundation (Forest Hill, Md., USA).

Figure 3:
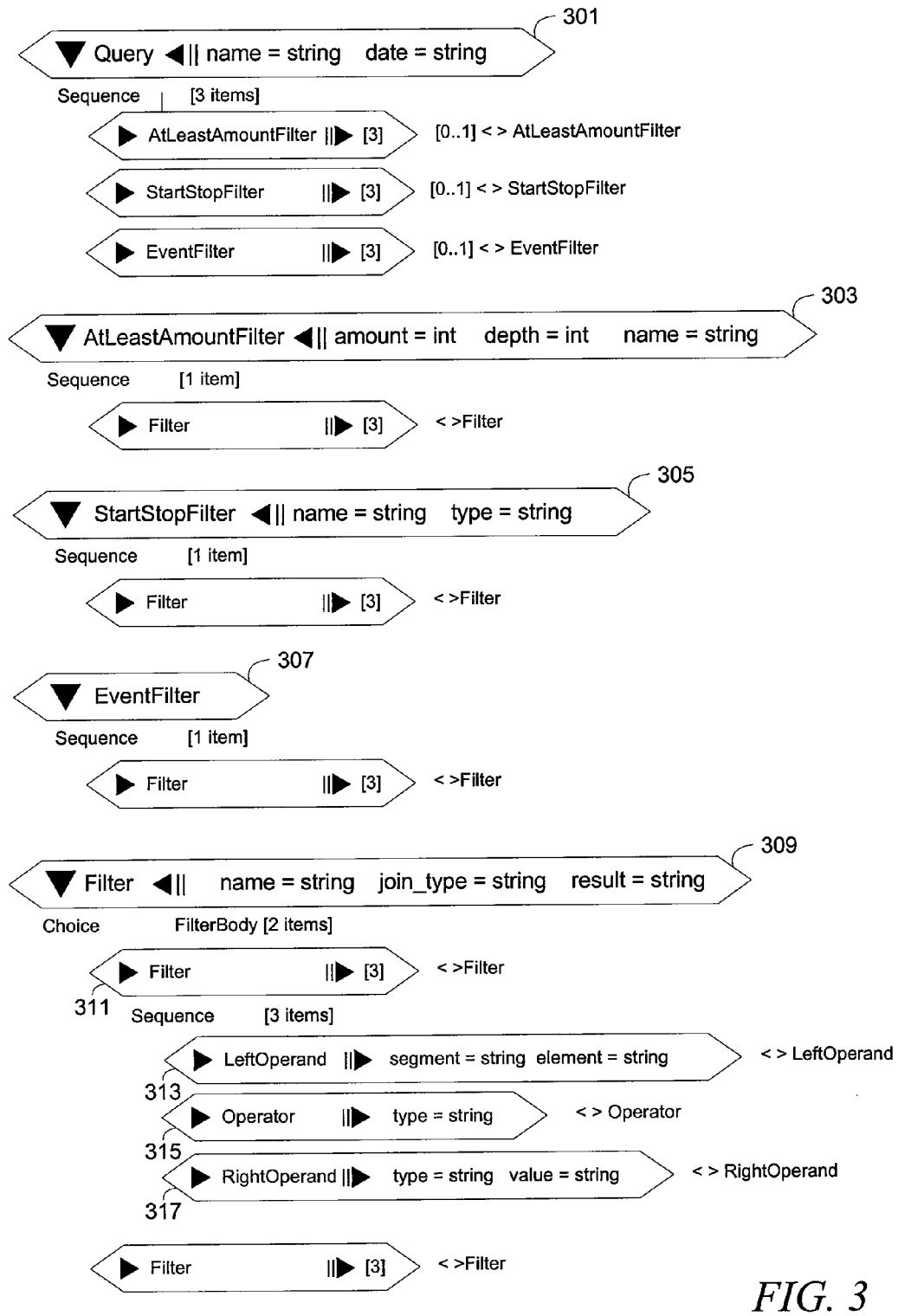
FIG. 3 is an exemplary schema of a query language usable with the processing system of FIG. 2.

FIG. 3 provides a general overall schema of the MQL that will be understandable to one of skill in the art. In general, the MQL affords complex conditional combinations over different segments of the events. The MQL may therefore act as a front-end filter to extract events of a particular group of users from log events stored in a sojourner log file 217 of FIG. 2 (e.g., a log of user traversal paths). The MQL structure may be an XML string followed a well defined XML schema as noted in FIG. 3.

For example, an analyst may find a report on the activities of users who queried on the word "iPhone" and bid on one or more items on the eBay® site that resulted from the query. This expands to the logic of "for all the sessions that contain at least one search event on iPhone and one make bid event, start tracking the activities after the search event until they left eBay®, and also, ignoring all the pages that are not visible to the users."

A specific exemplary implementation of the MQL is now described. A query element 301 is the root element of the MQL. The query element 301 contains two attributes, name and date. Name is used as a key to locate the query field 301 element and date is a date range defining an analysis on logs over a range of days. The query element 301 has three children, an AtLeastAmountFilter element 303, a StartStopFilter element 305, and an EventFilter element 307. Each child can appear at most once. The filters are constructed into a pipe-and-filter structure. Sessions are the data transferred from filter to filter, and the AtLeastAmountFilter element 303 is the first filter, then the StartStopFilter element 305, and the EventFilter element 307.

The AtLeastAmountFilter element 303 is used to extract all the sessions such that within a session, the number of valid events is greater than or equal to the amount attribute of the AtLeastAmountFilter element 303. A depth attribute further constraints the condition must meet within the first i events. An event in a session is validated by the Filter element in the AtLeastAmountFilter element 303. An output is sessions that meet the criteria and will then passed to the next filter.

The StartStopFilter element 305 is used to set the point of when to start or stop the tracking of users' activities. The type attribute set determines whether the StartStopFilter element 305 is a start-tracking-after-something or stop-tracking-before-something filter. The start/stop point is an event in a session that meets the condition specified by the Filter element in the StartStopFilter element 305. All the events in a session that are outside the start/stop point will be filtered, and the remaining data may be then sent to the next filter.

The EventFilter element 307 extracts all events that meet a certain condition defined in the Filter element of the EventFilter element 307. The EventFilter element 307 iterates all events in a session, applies the conditions to each of the events, and outputs only valid events.

A Filter element 309 constructs nested and complex Boolean logical expressions in prior filters. The Filter element 309 contains one or more children. Each child is either a Filter or an AtomicExpression element 311. A Filter joins all Boolean results returned by its children and returns the results to a parent filter (if any). The join type expression is either "OR" or "AND." With the nested structure and the join, one can compose complex queries using the Filter element 309.

The AtomicExpression element 311 represents a basic Boolean logic element. The AtomicExpression element 311 evaluates an incoming event and returns true if the condition is met, otherwise, returns false. The AtomicExpression element 311 has three children, a LeftOperand element 313, an Operator element 315, and a RightOperand element 317.

The LeftOperand element 313 indicates which condition is applied to a given element of a segment of a log event. As noted above, an event is divided into several segments and each segment contains one or more elements. The segment attribute specifies the name of a segment (e.g., FIELD), and the element attribute specifies the name of an element in the segment (e.g., PageName). The Operator element 315 includes and acts with conditional operators such as >, <, =, < >, ≥, ≤, contains, and not_contains. The RightOperand element 317 specifies a data type (e.g., integer, float, string, etc.) of the element in the LeftOperand element 313 and a desired value of the element.

In conjunction with the LeftOperand element 313, the Operator element 315, and the RightOperand element 317, a Boolean logic element (an AtomicExpression element), may be composed such as "PageName!=GetResult," and further uses the Filter element to compose a nested Boolean logic.

Forward-Looking and Backward-Looking Graphs

In a specific exemplary embodiment, the graph generator 215 (FIG. 2), generates two types of results for each MQL request, (1) the first i pages visited by a user in a session; and (2) the last i pages visited by a user in a session. Paths and page names in a time sequence usually have a common prefix at the beginning and then become different as the depth of paths increases. Paths may be aggregated and represented as PPTA; a directed graph with one root, and many nodes and edges, where an edge represents the transition probability from node A to B. The two kinds of paths generated by the graph generator 215 are represented in forward-looking graphs and backward-looking graphs.

Figure 4:
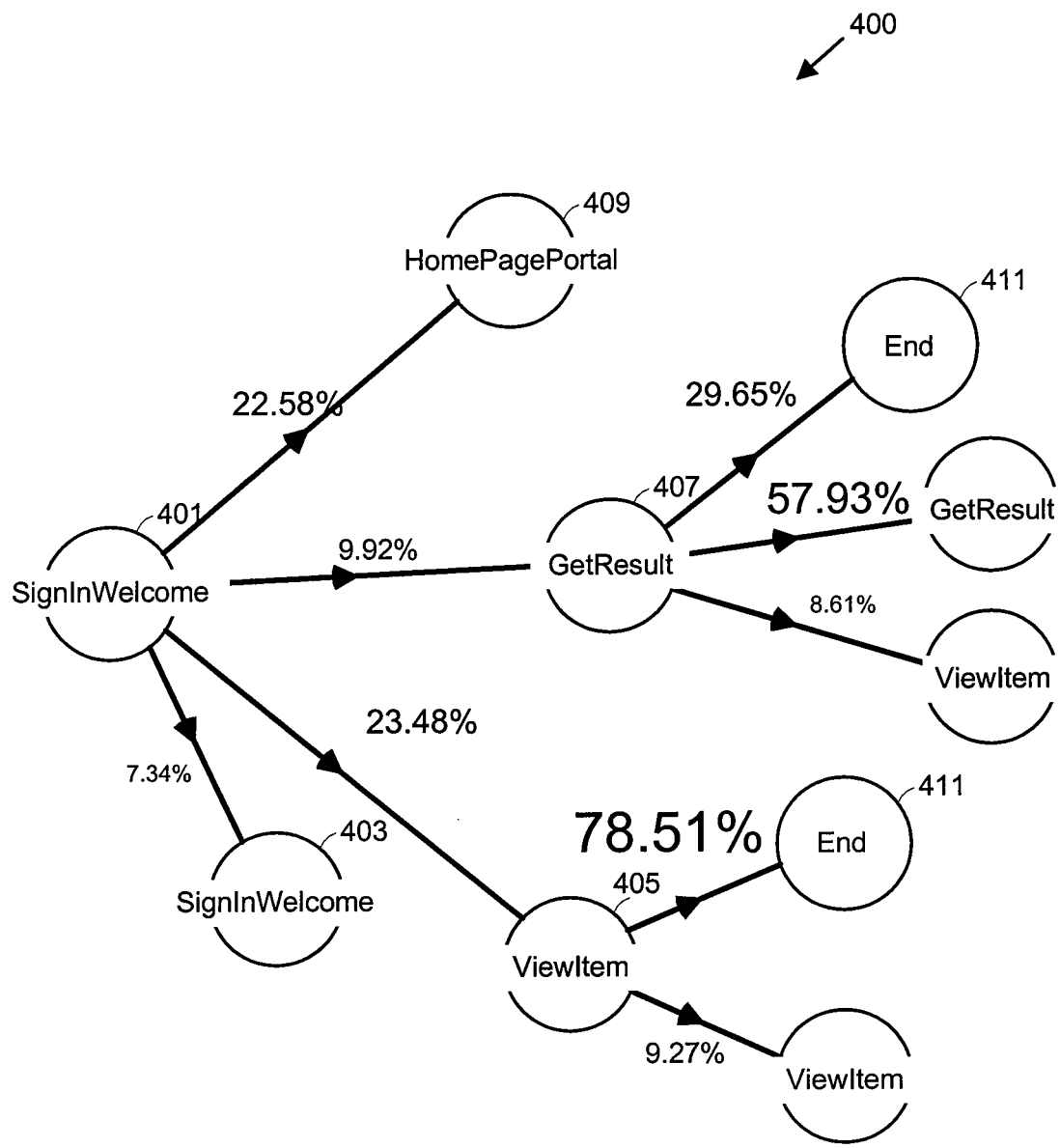
FIG. 4 is an exemplary unreduced forward-looking graph.

With reference to FIG. 4, a default output may consist of an exemplary embodiment of a forward-looking graph 400. The forward-looking graph 400 is a tree-structure with the entire tree rooted at a start node 401. The forward-looking graph 400 shows user transitions from where the user first enters a site (i.e., the start node 401) to exiting the site at an end node 411. The forward-looking graph 400 may be used to understand what the user did after a prior step by tracking the user path or paths going forward from the start node 401 through a plurality of additional nodes 403-409 (described individually, below). For each node, the directional edges "going out" contain percentages of transitions to the target states of the edges. Transitions with a weight lower than a given percentage may be excluded to prevent an overly complicated node graph with numerous different low probability transitions. In a specific exemplary embodiment, the forward-looking graph 400 of FIG. 4 excludes any transition with a weight less than 5%.

The forward-looking graph 400 may thus be an aggregation of the first i pages visited by users in sessions and contains only one root node, the start node 401 that represents a session start or when a start point is begun (specified by the StartStopFilter 305, FIG. 3).

Edges going out from a node denote a probability distribution of the next possible nodes (i.e., its children). The sum of the probabilities of all the edges going out of a node should be 100%. However, as noted above, the system architecture 200 (FIG. 2) includes an adjustable threshold value to exclude transitions below a given probability level. In the forward-looking graph 400, only out-going edges may be meaningful, while the percentages labeled on the edge mean little to the target node in terms of incoming traffic.

The forward-looking graph 400 may typically be used when an analyst wants to know what happened after something (e.g., after the user entered the site and searched for "mustang" on the eBay® site). For the exemplary eBay® use case, four pages, a SignInWelcome page, 403, a ViewItem page 405, a GetResult page 407, and a HomePagePortal page 409 are the most likely ones to be the first landing page on the eBay® US site. The SignInWelcome page 403 is the login page, the ViewItem page 403 indicates a page for viewing details of an item, the GetResult page 407 indicates a query result, and the HomePagePortal page 409 is the home page of eBay®. The analyst can then expand a node (the GetResult page 407, for example) to see what the next pages after that page are.

Figure 5:
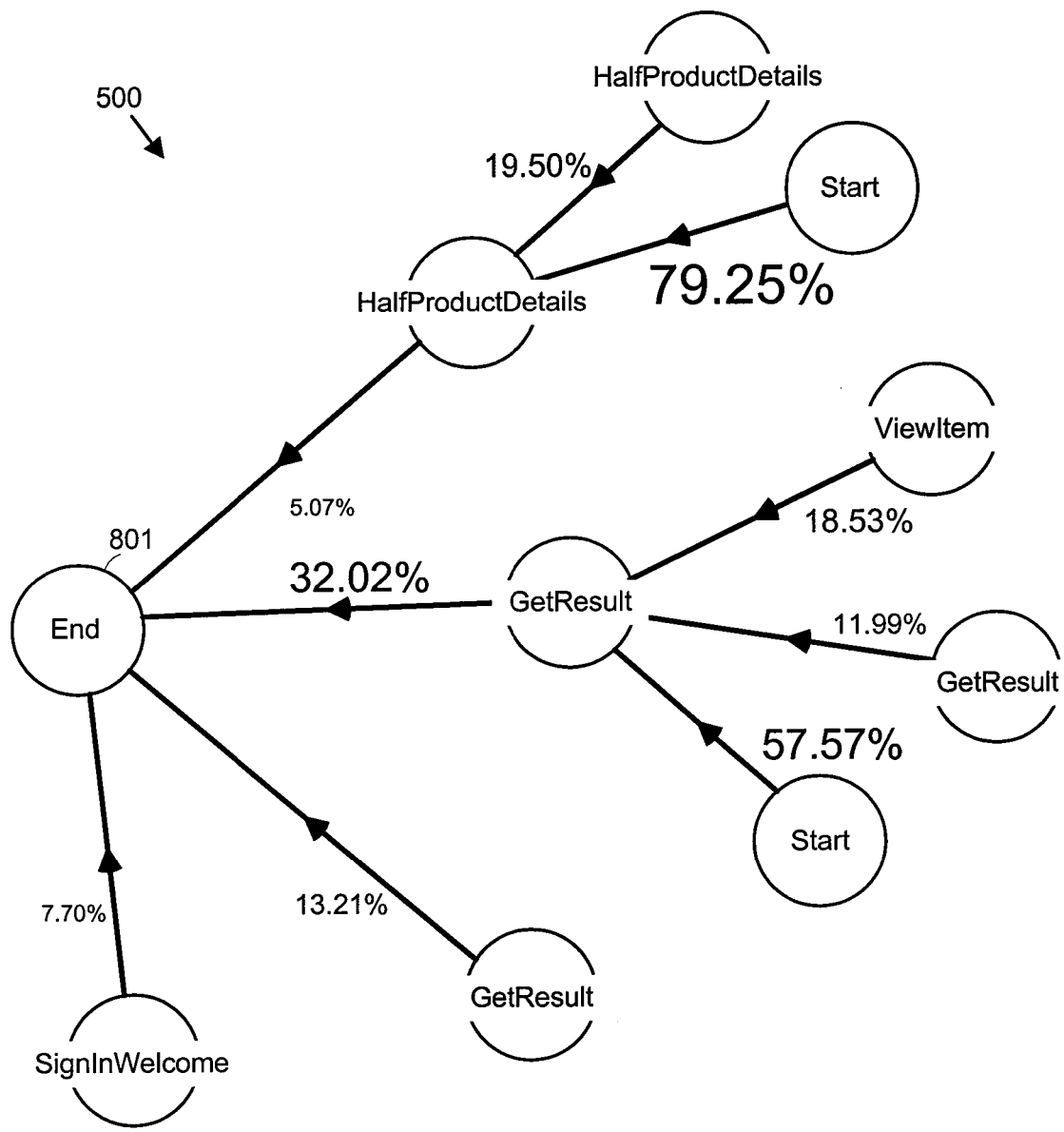
FIG. 5 is an exemplary unreduced backward-looking graph.

Referring now to FIG. 5, an exemplary embodiment of a backward-looking graph 500 is a tree-structure with the entire tree rooted at an end node 501 that maps the activity of the user that led to exiting the site. The backward-looking graph 500 may be used to understand what the user did before a prior step thus tracking the user path backwards coming into a node starting from the end node 501. For each node, the directional edges "coming in" contain percentages of transitions to the target states of the edges. As with the forward-looking graph 400 of FIG. 4, in a specific exemplary embodiment, the backward-looking graph 500 of FIG. 5 excludes any transition with a weight less than 5%.

The backward-looking graph 500 contains only one root node, an end node 501 that represents when a session ended or when a stop point was reached (specified by the StartStopFilter 305, FIG. 3). In the backward-looking graph 500, probabilities of the edges coming into a node should add up to 100% (as above, in this exemplary embodiment, edges below 5% will not appear). For example, for all the traffic coming into the end node 501, about 32% of the traffic came from the ViewItem pages and about 13% came from the GetResult page. The backward-looking graph 500 may be used when the analyst wants to know what the users did prior to something (e.g., before the user left eBay® or before the user made a bid).

The resulting output of either graph type may be created by first generating a Prefix Tree Acceptor (PTA) from the page-type sequence in the sessions matching the criteria of the report, and subsequently converted to a Probabilistic Prefix Tree Acceptor/Automaton (PPTA) by weighting each transition's count against the count of its prefix state. The weights may be converted to probabilities. For the backward-looking graph 500, the sequence of page-types within each session may simply be parsed in reverse order.

Given that a large web site (for example, a site such as eBay®), has thousands of unique page-types, and that sessions across users can be quite different, the output visualization in the form of either graph type may become busy and complex even for short depths of transitions. The visualization system therefore provides additional intelligence to the analyst in terms of discovering patterns that may be not easily visible to the human eye.

Accordingly, a novel method described herein takes a basic acyclic PPTA and infers a highly reduced, possibly cyclic PDFA with minimal divergence or loss of information. This concise, compact PDFA can then be visualized and manipulated by the analyst using the same web-based interface. This result may be made available for both the forward-looking graph 400 of FIG. 4 and the backward-looking graph 500 of FIG. 5 thus providing an extremely powerful tool for analyzing various features of any web-site with definable resolution.

Constructing a Probabilistic Automaton

The preceding section details how the forward and backward PPTA's may be used to visually render the forward and backward graphs. The result so far may be acyclic, with no graphing analysis having been performed, no redundancies discovered, and no patterns revealed. Note that, except for the weights of the edges going out of a node (in the forward-looking graph 400) and coming into a node (in the backward-looking graph 500), the nodes may be duplicated as deemed necessary. A novel exemplary method is described below that addresses challenges of reducing a graph without a loss of information. Simultaneously, changes are represented in a visually appealing manner.

One goal of the exemplary method may be to determine common patterns in a tree and unify occurrences of these patterns to build a compact structure. In formal terms, a PDFA is inferred from a positive sample of an unknown language that may be modeled by a generated PPTA. Continuing reference to FIGS. 4 and 5 is useful to a person of skill in the art to appreciate the discussion that follows.

In a typical PPTA representation, nodes may be labeled with a unique state name corresponding to an entire ordered set of prefix symbols encountered in reaching that node from the root. Further, the edges may be labeled with the last symbol in its prefix state and its probability of occurrence compared to its parent.

In contrast, node names under various embodiments of the present disclosure are actually labeled with the last symbol of the prefix leading to that node, and the edge is labeled with only a probability score. Thus, when a state merging method is applied to the PPTA, states cannot be merged with other states having a different last prefix symbol. For example, a node labeled "ViewItem" cannot be merged with a node labeled "MyEBay."

Additionally, to preserve the visual aspect of a merge, the last node of one state and its entire sub-tree is removed and replaced with a "shortcut" edge to the other state. Therefore the entire prefix path of both states is preserved, but both of them share a common sub-tree. There is no restriction placed upon a child node having a shortcut edge to a parent node a few levels up. Therefore, loops can potentially be uncovered as a result of analysis thus creating an enhanced visualization aspect.

To minimize a proliferation of long shortcut edges from one section of the tree to another distant one, it may be desirable to first discover local patterns, for example, where the sub-tree of a child node may be found to be similar to the sub-tree of a parent node. These are "self-similar" or "fractal" patterns. This type of pattern might seem impossible at first glance, but they indeed do occur, and quite frequently in fact. Discovering such patterns in the first pass as a priority significantly reduces the size of the tree, with entire branches disappearing and replaced with only a small shortcut edge from a node pointing back to itself.

Figure 6A:
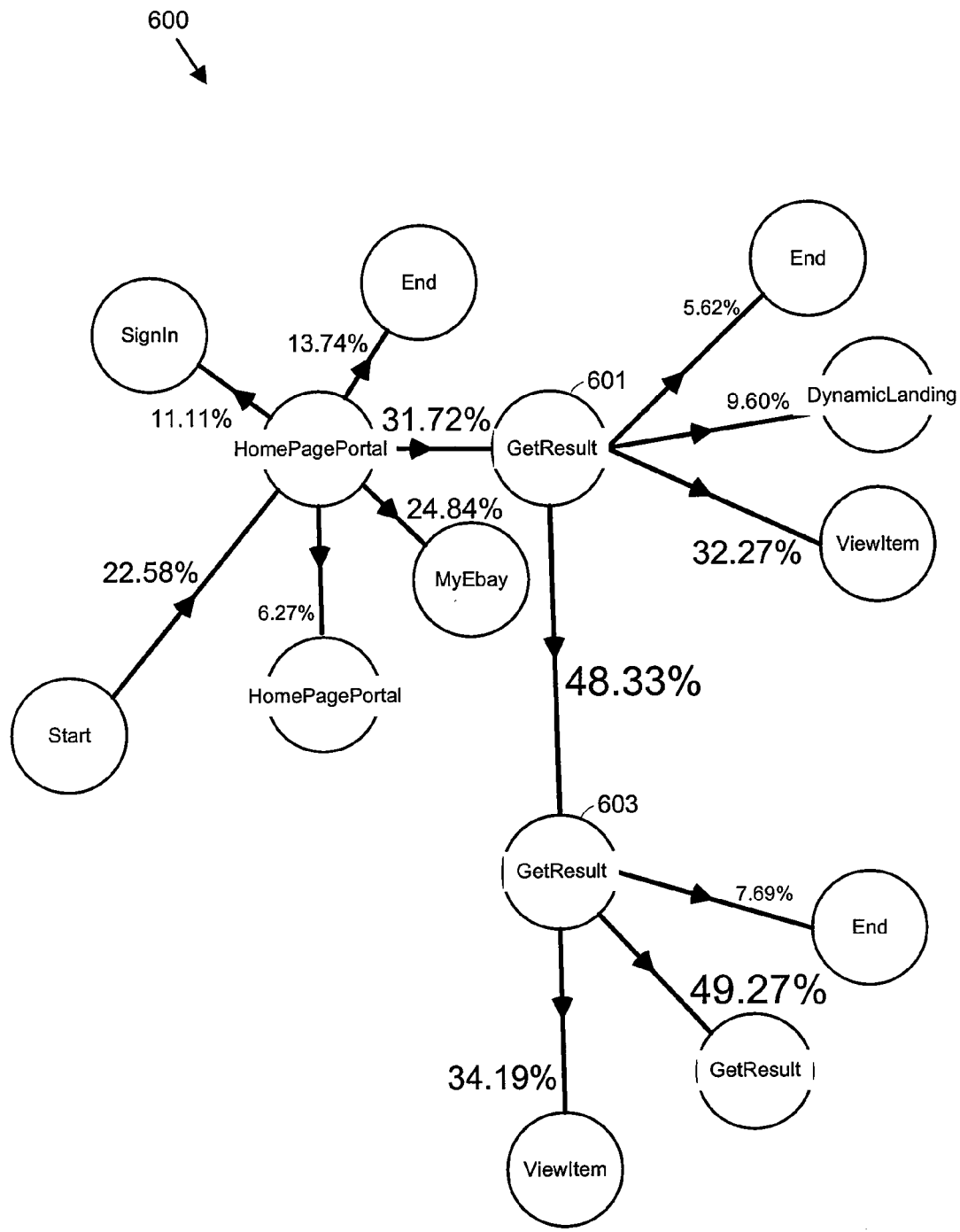
FIG. 6A is an exemplary unreduced forward-looking graph having similar children.

Referring now to FIG. 6A, an exemplary un-reduced graph 600 shows a repeating pattern in a first 601 and a second 603 GetResult node. The first 601 and the second 603 GetResult node each have similar children (i.e., both have GetResult, ViewItem, and End nodes as the children) with probabilities shown in the edges.

Figure 6B:
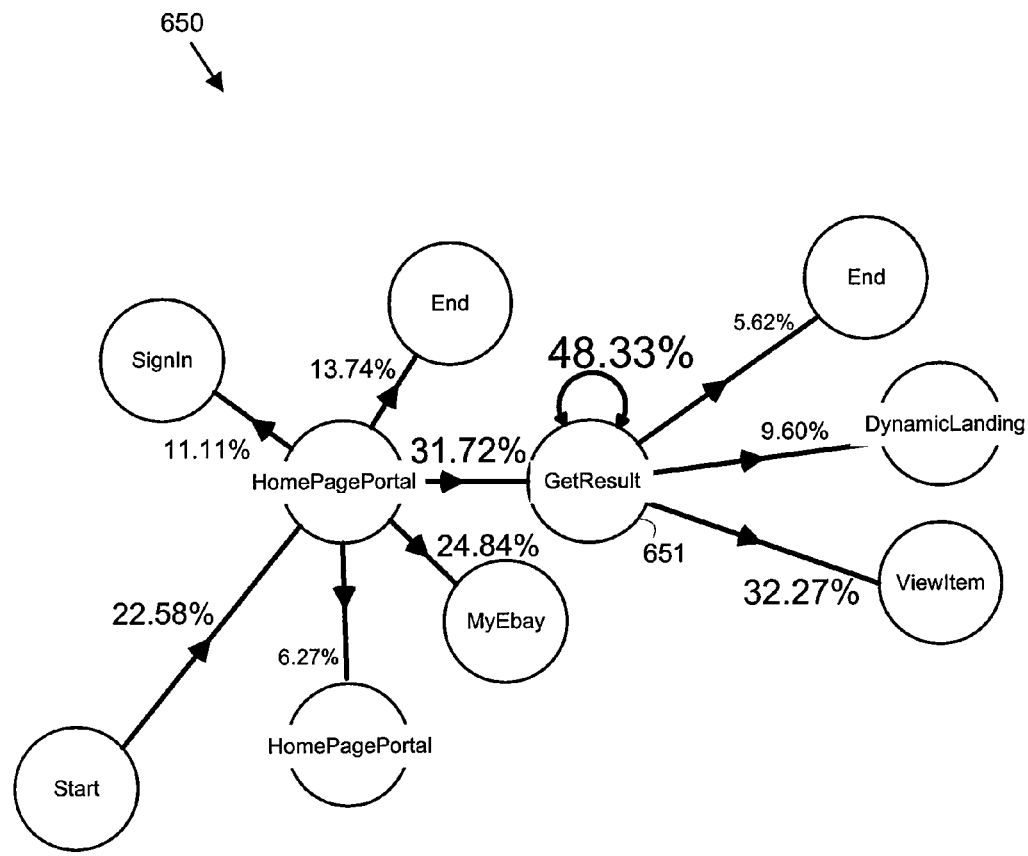
FIG. 6B is the exemplary unreduced forward-looking graph of FIG. 6A with similar sub-trees being merged.

In FIG. 6B, an exemplary reduced graph 650 shows where the similar sub-trees of FIG. 6A have been merged. The first 601 and the second 603 GetResult nodes of FIG. 6A have been substituted with a new GetResult node 651 that has a 48.33% self-link due to the prior similarity on the sub-tree of FIG. 6A.

Additionally, a global probability score of a state may be derived from the global frequency of the state. The global frequency of a state may simply be the count associated with in the originally generated PTA. Alternatively, the global probability of a state may simply be the global frequency of a state divided by the global frequency of the root state. The global probability of a state can also be derived by multiplying the probabilities along all the edges in its prefix path in the original PPTA.

To maintain integrity with the visualization system, a constraint is added that a shortcut must, in this exemplary embodiment, always point from a less globally frequent state to a more frequent state. As the sub-tree of the more frequent state will usually be richer than that of the less frequent one, it minimizes the chance of information loss. This also has an unexpected, yet positive, side effect of generally limiting an overall depth of a resulting graph, as many child nodes start pointing to nodes at higher levels, usually well before the original leaf depth may be reached. Moreover, the suffix states of every state are sorted in a decreasing order of probability. This also reinforces the tendency of the final result to be self-limiting in depth. The overall method details are provided below to aid one of skill in the art in a better understanding of various embodiments of the present disclosure.

To perform any kind of state merging (or drawing shortcut edges), criteria should exist for identifying similarity of states. Once such a criterion is identified, the method, described below, functions by iterating over the entire tree, finding pairs of states above a given similarity threshold. Upon finding a pair, for example, A and B, and assuming that A has a lower global probability score than B, the deepest node corresponding to A (e.g., P) becomes "invisible" along with its entire sub-tree. As the edge coming into P from P's parent is left hanging, that edge may now be redirected to point to the deepest node of B (e.g., Q), while still preserving the probability score labeled on the edge. Q now has two logical "parents," as it has two edges coming into it from different prefixes, with a different transition probability on each edge. Both the prefix paths corresponding to A and B now share the same sub-tree, that which may be the sub-tree of B.

As a result of a single merge operation, the only logical change to the information in the tree was the re-use of B's sub-tree as the sub-tree of A. In the extreme case, if the sub-trees of A and B may be identical in structure, it would mean no loss of information, despite the number of nodes having being reduced.

This leads to a retrospective conclusion that the state similarity function between two states A and B must ideally compare the entire sub-trees of A and B, down to the leaf level. If the sub-tree of less common A is highly similar in structure to that of more common B, then B's sub-tree can simply be used twice.

State Similarity Evaluation Method

An exemplary embodiment includes a highly efficient state comparison method that computes a "similarity score" between two sub-trees in a PPTA. Instead of a Boolean "compatibility" function as is found in various prior art systems, the method described herein returns a more familiar similarity score between two sub-trees, e.g. a zero ("0") when there is no commonality, and a one ("1") only when they are perfectly identical, right down to the leaf level. This allows a familiar "similarity threshold" to be used in percentage terms as a means of controlling the degree of reduction applied to the tree.

Let P be the symbol corresponding to the last suffix in state A, and let Q be the symbol corresponding to the last suffix in state B.

Thus, given a suffix of A and a suffix of B (or a child of P and a child of Q), such that both correspond to the same symbol, their contribution to the similarity score may be derived from the similarity in their respective transition probabilities, coupled with the similarity between their own children, recursively.

The first criterion for similarity testing is determined by a simple equivalence such that $$P = Q$$

Assuming P=Q is true, then let there be m direct children of P, denoted by $$C(P) = \{P_1 \ldots P_m\}$$

and n direct children of Q, denoted by $$C(Q) = \{Q_1 \ldots Q_n\}$$

Let $p_i$ denote the transition probability from P to $P_i$, and similarly $q_j$ be a transition probability from Q to $Q_j$. Let S(P, Q) denote the similarity score between two states A and B, where P and Q are the final suffix symbols of A and B, respectively.

To find S(P, Q) we first need the commonality between vectors of their children is needed.

$$G(P, Q, i, j) = \begin{cases} 0 & P_i \neq Q_j \\ \min(p_i, q_j) & P_i = Q_j \end{cases} \quad (1)$$

If there were no states at all after $\{P_1 \ldots P_m\}$ and $\{Q_1 \ldots Q_n\}$ then simply:

$$S(P, Q) = \sum_{i=1 \ldots m} \sum_{j=1 \ldots n} G(P, Q, i, j) \quad (2)$$

Each common child between C(P) and C(Q) contributes a score equal to a minimum transition probability of the two children. If neither any of C(P) and C(Q) had any children, and if the vectors were identical, S(P, Q) would be 1.

Now consider a case when there may be states beyond C(P) or C(Q). Assuming $P_i = Q_j$ in equation (1), the contribution of G(P, Q, i, j) defines not only the similarity between one pair of common children of P and Q, but it must also be made to weight the similarity between the common children of $P_i$ and $Q_j$, and so on, recursively. Furthermore, as a mechanism of smoothing, the contribution of $P_i$ and $Q_j$ is equally divided between their similarity from the perspective of P and Q, which is equal to G(P, Q, i, j), and the similarity between the children of $P_i$ and $Q_j$, which of course is equal to $S(P_i, Q_j)$.

So, for every child $P_i$ of P and $Q_j$ of Q where $P_i = Q_j$, let K(P, Q, i, j) denote their contribution to the similarity score between P and Q. Consequently, $$K(P, Q, i, j) = \frac{G(P, Q, i, j) + G(P, Q, i, j) \cdot S(P_i, Q_j)}{2} \quad (3)$$

which reduces to $$K(P, Q, i, j) = \frac{G(P, Q, i, j)[1 + S(P_i, Q_j)]}{2} \quad (4)$$

resulting in $$S(P, Q) = \sum_{i=1 \ldots m} \sum_{j=1 \ldots n} K(P, Q, i, j) \quad (5)$$

A skilled artisan will appreciate that equation (5) results in a score of zero only when P and Q have no common children, and a score of one only when the entire sub-trees of P and Q may be perfectly identical. Also, the occurrence of S within the definition of K in equation (3) exposes the recursive nature of the evaluation.

Two issues remain in the analysis. First, given that the mechanism is recursive, there must be a terminating condition. Termination happens either when m=0 or n=0. If P and Q were both leaf node(s), then S(P, Q) may take a value of either one or zero. However, since no evidence exists to indicate the contrary, they must be similar, or identical. But if only one of them is a leaf node, then that in itself is evidence to indicate di-similarity. One node has children, the other does not. In this case, S(P,Q) is evaluated as zero.

Second, while comparing P and Q, if children $P_i = Q_j$, and if $P_i$ has no children, but $Q_j$ does, the contribution of the similarity between $P_i$ and $Q_j$ must be evaluated in light of the similarity of P and Q.

As a result of the evaluation, equation (3) must be reevaluated. The contribution between the two components must be distributed in a manner which incorporates the possibility of some children being leaf nodes. If any child is a leaf node, then no weight need be given to the similarity of its children.

Let:

$$L(P, Q) = \frac{\sum_{i=1 \ldots m} p_i \sum_{j=1 \ldots n} q_i}{2}$$

where variables may be readily discerned from verbiage above. Then $$K(P, Q, i, j) = \frac{G(P, Q, i, j) + G(P, Q, i, j) \cdot L(P_i, Q_j) \cdot S(P_i, Q_j)}{1 + L(P_i, Q_j)}$$

which reduces to $$K(P, Q, i, j) = \frac{G(P, Q, i, j)[1 + L(P_i, Q_j) \cdot S(P_i, Q_j)]}{1 + L(P_i, Q_j)}$$

Reduction Method

Before proposing an exemplary embodiment of a reduction method, a summary of proposed exemplary features or constraints may be considered under the following list. For example, (i) Sibling nodes may be sorted in a decreasing order of probability score.
(ii) A tree may be traversed depth first.
(iii) A first pass may be used to discover local similarities; a second pass may be used to discover global similarities.
(iv) Similar states may be not actually "merged." The "merged" output may actually be identical to a more frequent state. There may be a few reasons for this. A first reason may be performance. A second reason may be interactivity. Due to this decision, the exemplary reduction process can be interactively and incrementally applied to the visual display of a graph. The client's display side data structures will readily keep up with changes in the graph structure. If sub-trees of similar states were actually merged, interactivity would be significantly more complex, along with impacting performance. Therefore, a merge may instead be simply reflected by drawing a shortcut from state A to a similar state B.

(v) Effects of the decision in item (iv) may be somewhat ameliorated by adding a constraint that a shortcut must always be made from the state that may be less popular globally, to the one that may be more popular globally. This statement is generally true since the more popular state will have a richer sub-tree than the less popular state, thus reducing the loss of information compared to the other way around.

Assuming there are Q unique symbols, tracked up to a depth of d, a PPTA built from these data could theoretically contain up to $Q^d$ nodes. In practice, the number is generally much less as it is bound by the number of actually occurring unique states in a positive sample. A task is to reduce this number even further by finding nodes which have the same name, and a similar sub-tree.

Let I(P) be the global probability of the state corresponding to node P. Simply put, given the entire input data set, this is the probability of occurrence of the entire prefix path from root to P. Given a PPTA, a trivial way of obtaining I(P) would be to multiply the probabilities of the edges along the path from root to P. S(P,Q) denotes the similarity score between two nodes P and Q and T denotes a threshold test applied to S(P,Q) as a criterion for merging P and Q.

The method proceeds by comparing every possible pair of nodes in the tree. For every pair of nodes that meets the similarity threshold, the node with the lower global probability may be tagged with a shortcut to the node with a higher global probability (the target). The target node may be left unchanged.

First Pass

As noted above, the first pass only compares every node with its descendant nodes as a means of discovering local patterns first. The following pseudo-code, labeled as Method 1, presents a possible implementation.

Method 1

```
for each node P in PPTA, depth first
    if P is already tagged with shortcut, or P has no children
        skip to next sibling of P //skip all child nodes of P
    else
        for each node Q in PPTA that lies in sub-tree of P, depth first
            if P = Q and S(P,Q)≥T
                if (I(P) < I(Q)
                    tag P with shortcut to Q
                    skip P to its next sibling //skip all its children
                    break //exit inner Q loop
                else
                    tag Q with shortcut to P
                    skip Q to its next sibling //skip all children of Q
                end if
        end for //end Q loop
    end if
end for //end P loop
```

Note that in the first pass, I(P) is always greater than or equal to I(Q) (i.e., I(P)≥I(Q)), as Q is always a descendant node of P, or the state corresponding to Q is a suffix of state corresponding to P. This exemplary step may be retained here to maintain similarity to the second pass.

Second Pass

The exemplary second pass may be substantially similar to the first, except that the inner loop now traverses all the nodes of the PPTA, except those already traversed by the outer loop, and except those in the sub-tree of P. At the end of the second pass, every node will have been compared to every other node in the tree in accordance with Method 2, immediately below.

Method 2

```
for each node P in PPTA, depth first
    if P is already tagged with shortcut, or P has no children
        skip to next sibling of P //skip all child nodes of P
    else
        for each node Q starting from P's next sibling, depth first
            if P = Q and S(P,Q) ≥ T
                if (I(P) < I(Q))
                    tag P with shortcut to Q
                    skip P to its next sibling //skip all its children
                    break //exit inner Q loop
                else
                    tag Q with shortcut to P
                    skip Q to its next sibling //skip all children of Q
                end if
        end for //end Q loop
    end if
end for //end P loop
```

Third Pass

An additional pass can iterate over the entire tree, so as to tag every target node with its incoming list of shortcut nodes, along with their global probabilities. At the end of the iteration, every target node's sub-tree can be merged in a weighted manner with the sub-trees of its incoming nodes with the global probability of each sub-tree being used as its weight. This creates a result with even lesser divergence and loss of information compared to an output of the second pass, above.

Visualization of the Automaton

With reference again to FIGS. 4 and 5, in an exemplary embodiment, visualization of the automaton may begin with each state representing a visited page, and each edge representing a transition from page A to page B. Each transition may be labeled with a probability of that transition occurring. Additionally, a font size of a probability may be proportioned to its value, a larger font size for a large probability and a small font size for a small probability. Paths usually have a common prefix; the common parts of paths may be merged together during the visualization. As a result of the merge, users' activities look like a tree. However, since the number of activities can be quite large, only the root node and its first level children may be shown at the beginning. Clicking on any node expands the node. When a node is expanded, a path string is constructed from the root node to the clicked node as a query. The query is then submitted to the server to find any children of that node. A node can also be collapsed by clicking the collapse button on it and the children of the node will be hidden. The expanding and collapsing functions make it easy to keep the graph manageable and focus on relevant parts of the graph.

In a specific exemplary embodiment, the visualized graph may be configured to show edges with probability over a given threshold, for example, 5%. The threshold percentage may be changed to reveal only parts of the graph that fall within a certain probability range. The variable threshold percentage function is helpful when a group of paths is important but the amount of traffic may be relatively small compared to the whole graph. In a specific exemplary usage, paths are found to make bid events in an on-line auction which are important but may be below 5% of the total traffic to the on-line auction site.

The visualizing module may be configured to display two types of graphs, the forward-looking graph 400 (FIG. 4) and the backward-looking graph 500 (FIG. 5) in PPTA. When an analyst expands a node in the basic forward-looking 400 or backward-looking 500 graph, the server simply return lines of string, each line contains the name of a child and its probability. Children will be appending directly to their parent.

In addition to viewing the basic forward-looking 400 or backward-looking 500 graphs, the visualization module can view the PDFA graph (e.g., the reduced graph 650 of FIG. 6B) for each of them as well. When an analyst expands any node (e.g., a node E, not shown) on the reduced graph 650, the server might return two types of child node, one may be the normal child and the other one may be a "shortcut." The shortcut contains the transition probability and a full path for identifying a node (e.g., a node T, not shown) on the graph. When a child is a shortcut, it means its sub-tree is similar to the T node so the visualizer will create an edge between E and T. If the visualizer could not locate T, it means T has not been explored yet, and then the visualizer will create a new node (e.g., a node T') with a given probability and attach it to E. Later, when the T node is discovered along its original path (the full path), the system will create an edge from the parent of T to T'.

In a specific exemplary implementation, AJAX (asynchronous JavaScript and XML) may be used to enhance graph navigation smoothness. Further, Dojo (a modular open source JavaScript toolkit) may be used to implement functionality in the user interfaces, the job monitor 201 (FIG. 2), the query composer 203, and the graph visualizer 205.

Case Study

In a specific exemplary embodiment, behavioral differences between users who searched for "Longaberger" and those who search for "iPhone" on the eBay® website were studied. On eBay®, people who are interested in collectibles typically do not overlap with people who buy and sell electronic gadgets. The study was composed of two MQLs containing the following conditions:

1. Find sessions containing at least one query on iPhone or Longaberger.
2. Within those sessions, track the activities after the search events.
3. Track the events up to either seven steps or until the user leaves the site.
4. Ignore any invisible pages.

Figure 7A:
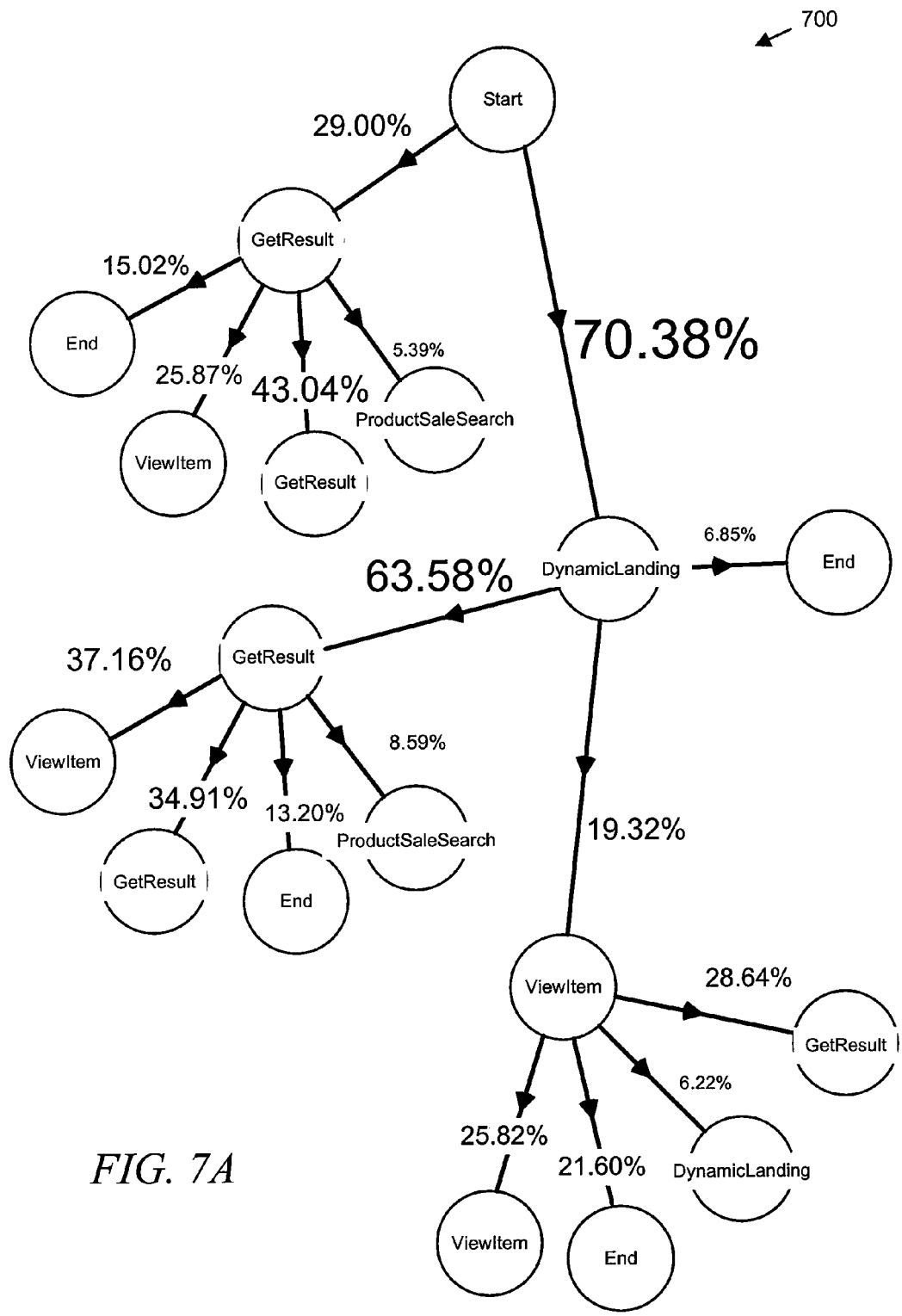
FIG. 7A is an exemplary unreduced graph indicating results from a first case study created using exemplary techniques of the present disclosure.
Figure 7B:
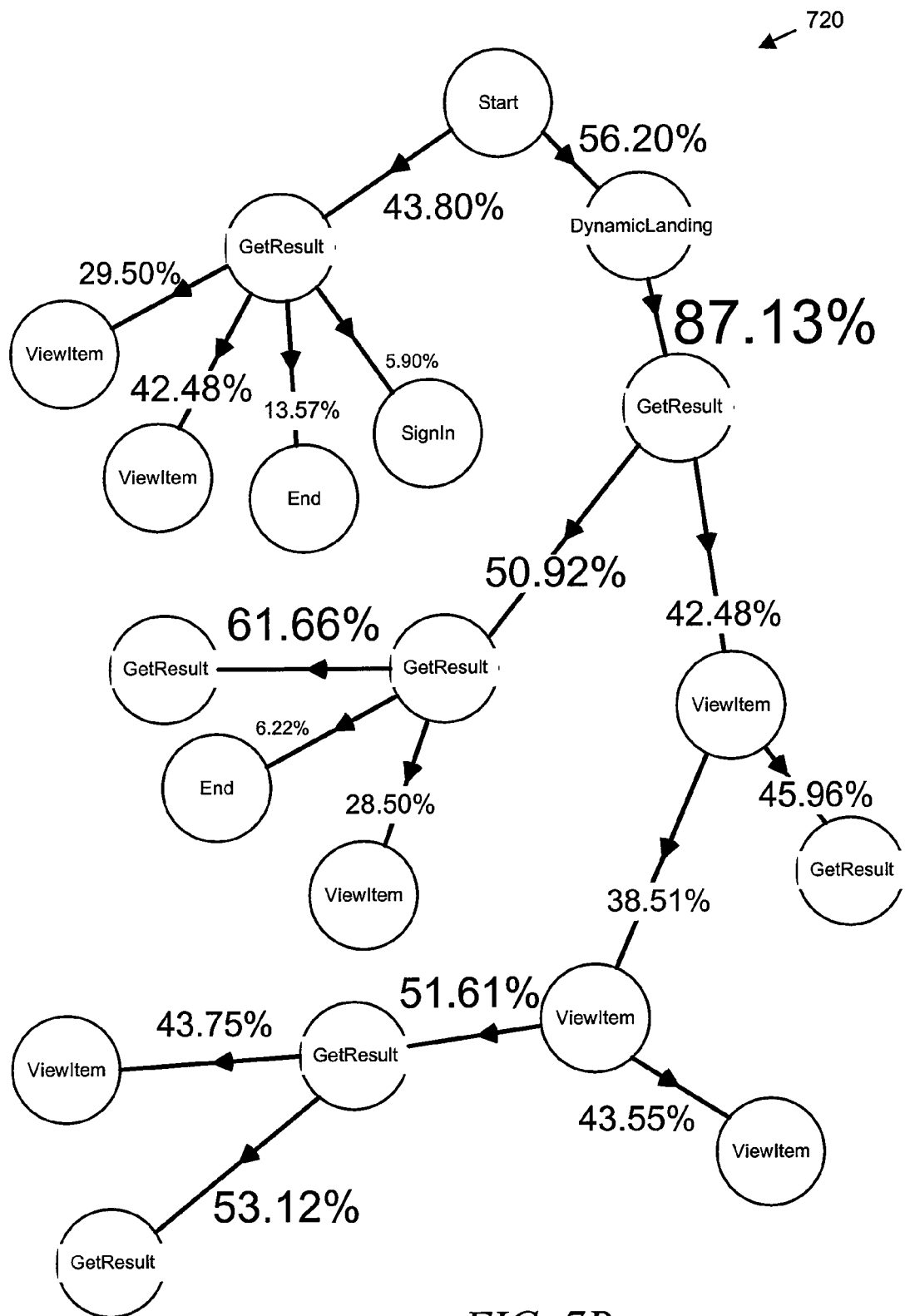
FIG. 7B is an exemplary unreduced graph indicating results from a second case study created using exemplary techniques of the present disclosure.

Referring now to FIGS. 7A and 7B, a forward-looking graph 700 displays paths for an iPhone searches. The forward-looking graph 700 does not expand the entire graph. The nodes indicated by DynamicLanding, GetResult, and ProductSaleSearch are searching pages. The nodes ViewItem are detail pages of an item that is clicked by the user. The node End means the user left eBay®.

Similarly, a forward-looking graph 720 of FIG. 7B displays paths for a user performing Longaberger searches. The Longaberger search user tends to do more searches prior to leaving eBay® than the iPhone search user. As indicated by the graphs 700, 720, the iPhone search user reaches the End nodes sooner with higher probabilities as displayed on the forward-looking graph 700 of FIG. 7B. Both graphs 700, 720 indicate the PPTA with no reduction.

Figure 7C:
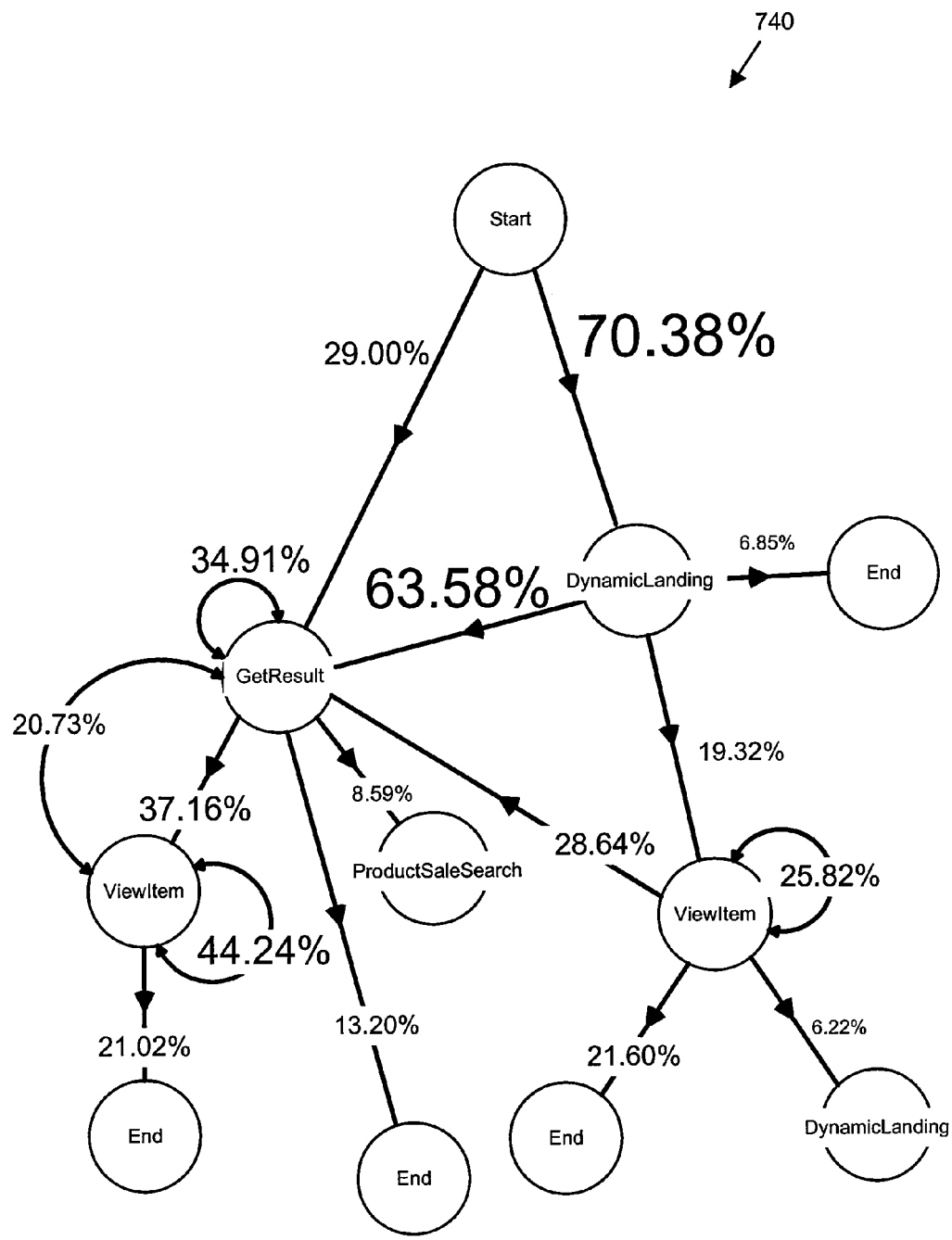
FIG. 7C is an exemplary reduced graph indicating results from the first case study of FIG. 7A created using exemplary techniques of the present disclosure.
Figure 7D:
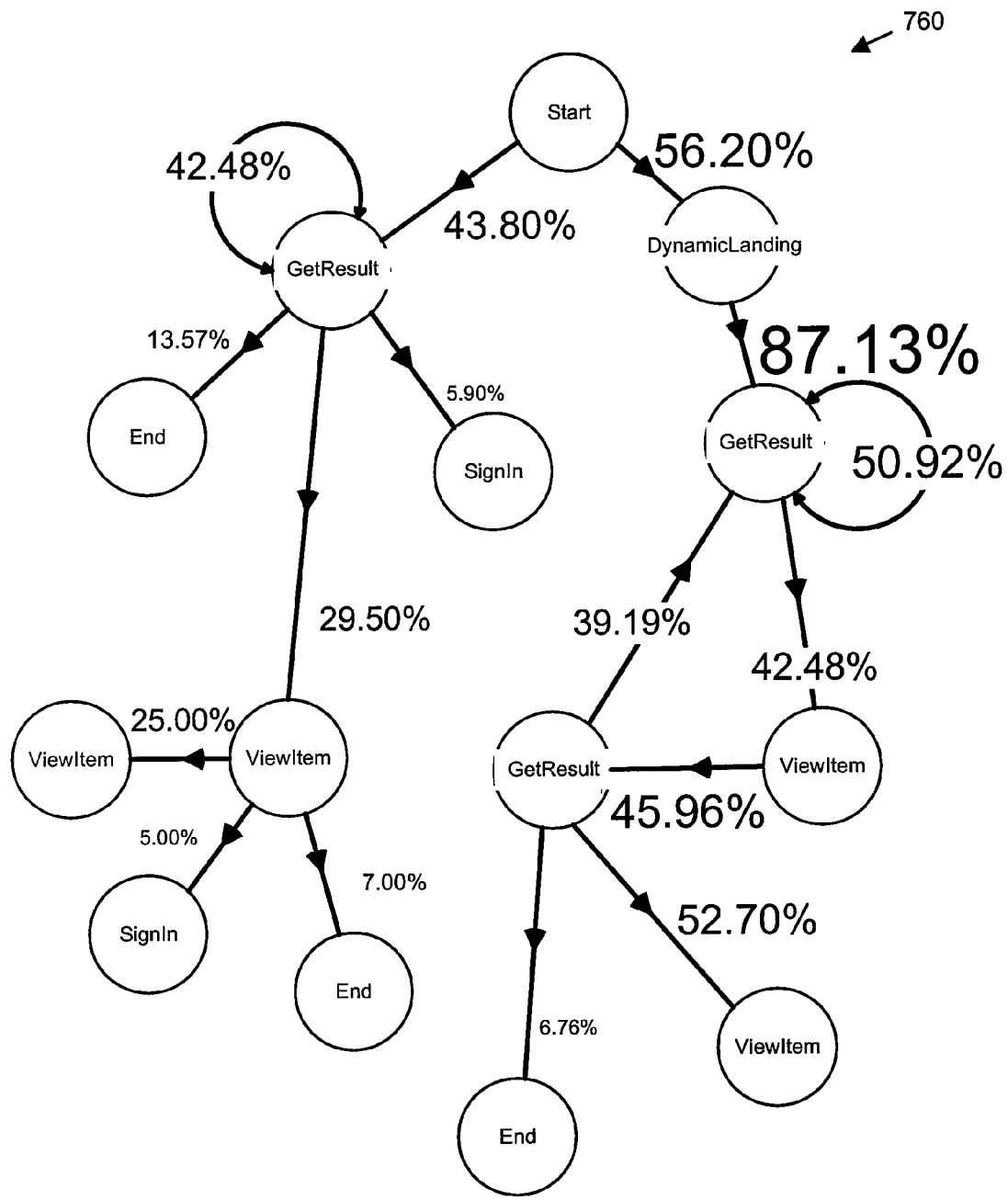
FIG. 7D is an exemplary reduced graph indicating results from the second case study of FIG. 7B created using exemplary techniques of the present disclosure.

With reference now to FIGS. 7C and 7D, a merge process of the graphs shown in FIGS. 7A and 7B has been run to generate PDFA graphs for both groups. The similarity threshold used here was 70%. Thus, if the similarity of two sub-trees in two difference paths is more than 70%, the two paths will be merged. The iPhone search reduced graph 740 indicates the iPhone search user tend to perform searches (indicated by the GetResult nodes) and check details (indicated by the ViewItem nodes) repeatedly. In contrast, the Longaberger search reduced graph 760 shows significant differences in browsing behavior compared with the iPhone search reduced graph 740.

Therefore, an intuitive, manageable, and graphically interactive system and method is shown to produce visual reports within a web-browser environment from large volumes of data, according to various exemplary embodiments. The problem of rendering complex cyclic automatons in a highly interactive yet visually appealing manner is addressed along with a novel method for inferring a reduced PDFA of user activity from raw session logs. As shown with respect to FIGS. 7A-7D, the system and method have been tested on comparative analyses studies and have proven their abilities to quickly deliver meaningful results.

Modules, Components, and Logic

Certain embodiments described herein may be implemented as logic or a number of modules, components, or mechanisms. A module, logic, component, or mechanism (collectively referred to as a "module") may be a tangible unit capable of performing certain operations and is configured or arranged in a certain manner. In certain exemplary embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry, or in temporarily configured circuitry (e.g., configured by software) may be driven by cost and time considerations.

Accordingly, the term module should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation, and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

Electronic Apparatus and System

Exemplary embodiments may be implemented in analog, digital, or hybrid electronic circuitry, or in computer hardware, firmware, software, or in combinations thereof. Exemplary embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

In certain exemplary embodiments, operations may be performed by one or more programmable processors executing a computer program to perform functions by operating on input data and generating output. Method operations can also be performed by, and apparatus of exemplary embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination permanently and temporarily configured hardware may be a design choice. Below are set out hardware (e.g., machine) and software architectures that may be deployed, in various exemplary embodiments.

Exemplary Machine Architecture and Machine-Readable Medium

Figure 8:
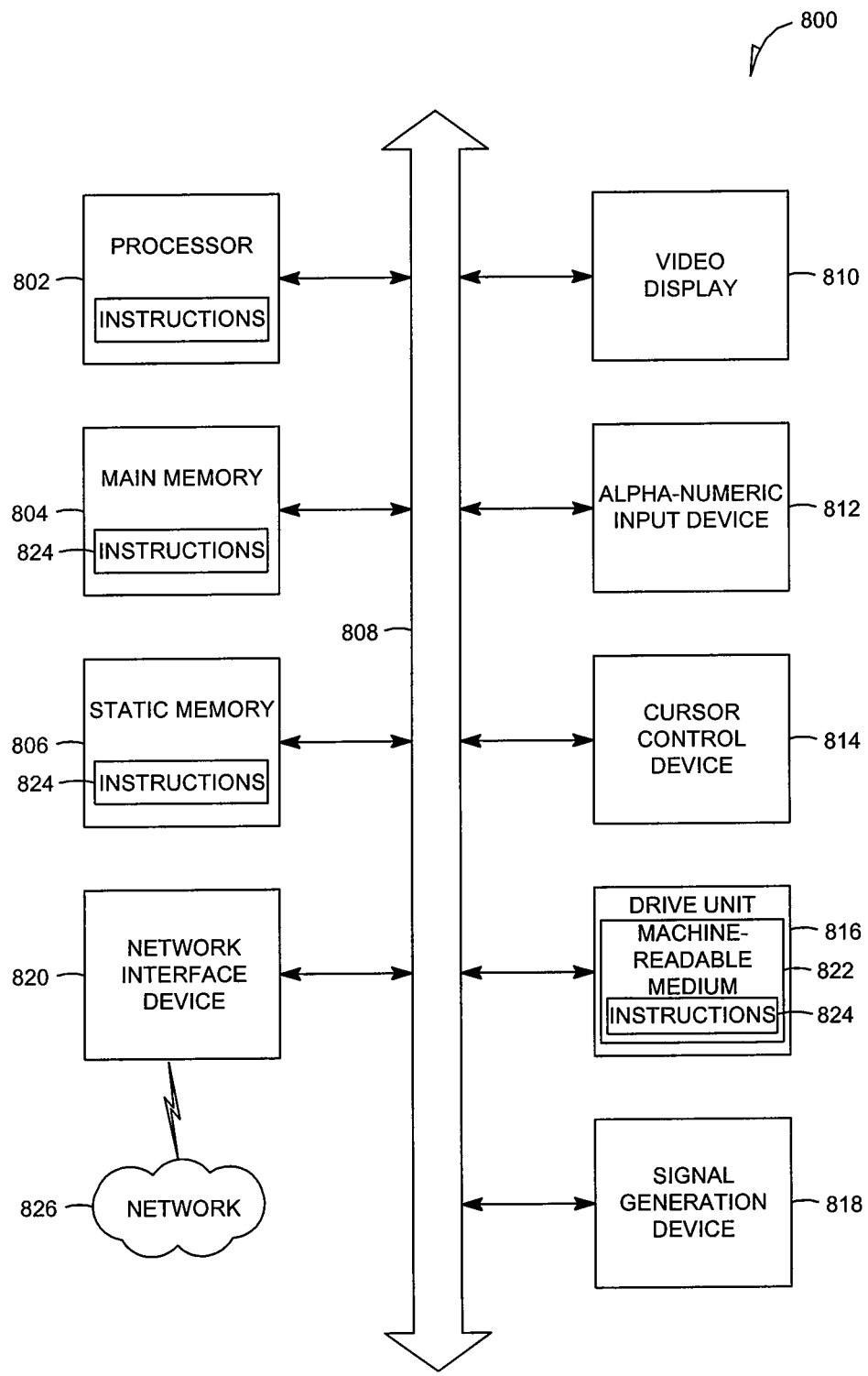
FIG. 8 is an exemplary embodiment of a computer system capable of performing exemplary techniques of the present disclosure described herein.

With reference to FIG. 8, an exemplary embodiment extends to a machine in the exemplary form of a computer system 800 within which instructions, for causing the machine to perform any one or more of the methodologies discussed herein, may be executed. In alternative exemplary embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a user interface (UI) navigation device 814 (e.g., a mouse), a disk drive unit 816, a signal generation device 818 (e.g., a speaker) and a network interface device 820.

Machine-Readable Medium

The disk drive unit 816 includes a machine-readable medium 822 on which is stored one or more sets of instructions and data structures (e.g., software 824) embodying or utilized by any one or more of the methodologies or functions described herein. The software 824 may also reside, completely or at least partially, within the main memory 804 or within the processor 802 during execution thereof by the computer system 800; the main memory 804 and the processor 802 also constituting machine-readable media.

While the machine-readable medium 822 is shown in an exemplary embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of the present disclosure, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of exemplary semiconductor memory devices, e.g., EPROM, EEPROM, and flash memory devices; magnetic disks such as internal hard disks and removable disks; magneto-optical disks; and CD-ROM and DVD-ROM disks.

Transmission Medium

The software 824 may further be transmitted or received over a communications network 826 using a transmission medium via the network interface device 820 utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Exemplary Three-Tier Software Architecture

In some embodiments, the described methods may be implemented using one a distributed or non-distributed software application designed under a three-tier architecture paradigm. Under this paradigm, various parts of computer code (or software) that instantiate or configure components or modules may be categorized as belonging to one or more of these three tiers. Some embodiments may include a first tier as an interface (e.g., an interface tier). Further, a second tier may be a logic (or application) tier that performs application processing of data input through the interface level. The logic tier may communicate the results of such processing to the interface tier, or to a backend, or storage tier. The processing performed by the logic tier may relate to certain rules or processes that govern the software as a whole. A third, storage tier, may be a persistent storage medium, or a non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. The three-tier architecture may be implemented using one technology or a variety of technologies. The exemplary three-tier architecture, and the technologies through which it is implemented, may be realized on one or more computer systems operating, for example, as a standalone system, or organized in a server-client, peer-to-peer, distributed, or some other suitable configuration. Further, these three tiers may be distributed between more than one computer system as various components.

Components

Exemplary embodiments may include the above described tiers, and processes or operations about constituting these tiers may be implemented as components. Common too many of these components is an ability to generate, use, and manipulate data. The components, and the functionality associated with each, may form part of standalone, client, server, or peer computer systems. The various components may be implemented by a computer system on an as-needed basis. These components may include software written in an object-oriented computer language such that a component oriented, or object-oriented programming technique can be implemented using a Visual Component Library (VCL), Component Library for Cross Platform (CLX), JavaBeans (JB), Enterprise JavaBeans™ (EJB), Component Object Model (COM), Distributed Component Object Model (DCOM), or any other suitable technique.

Software for these components may further enable communicative coupling to other components (e.g., via various Application Programming interfaces (APIs)), and may be compiled into one complete server, client, or peer software application. Further, these APIs may be able to communicate through various distributed programming protocols as distributed computing components.

Distributed Computing Components and Protocols

Some exemplary embodiments may include remote procedure calls being used to implement one or more of the above described components across a distributed programming environment as distributed computing components. For example, an interface component (e.g., an interface tier) may form part of a first computer system that is remotely located from a second computer system containing a logic component (e.g., a logic tier). These first and second computer systems may be configured in a standalone, server-client, peer-to-peer, or some other suitable configuration. Software for the components may be written using the above described object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

A System of Transmission Between a Server and Client

Exemplary embodiments may use the OSI model or TCP/IP protocol stack model for defining protocols used by a network to transmit data. In applying these models, a system of data transmission between a server and client, or between peer computer systems may, for example, include five layers comprising: an application layer, a transport layer, a network layer, a data link layer, and a physical layer. In the case of software, for instantiating or configuring components, having a three-tier architecture, the various tiers (e.g., the interface, logic, and storage tiers) reside on the application layer of the TCP/IP protocol stack. In an exemplary implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data are transmitted over a network such as an internet, Local Area Network (LAN), Wide Area Network (WAN), or some other suitable network. In some cases, Internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology), or structures.

Although an embodiment has been described with reference to specific exemplary embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

For example, particular embodiments describe various arrangements, methods, programming tools, and topologies of systems. A skilled artisan will recognize, however, that additional embodiments may be focused on performance and usability of the system. On the performance side, an exemplary embodiment may provide a distributed and highly scalable server-side platform for log processing. On the usability side, a further exemplary embodiment may include a temporal dimension to the graphs. By creating canonical reduced graphs for a consecutive series of time intervals, and then replaying them in order, a type of animated automaton may be created, which will vividly show the evolution of user behavior over time. An exemplary embodiment may also include enhancements to the visual aspects, for example, to depict transition percentages by the sizes of the nodes, rather than the thickness of the edges or font sizes. A further exemplary embodiment may provide an ability to visually perform operations on groups of automatons. For example, given two automatons, visually highlighting differences, or render a difference automaton. This may be useful, for example, in comparison of website performance before and after major feature launches.

These and various other embodiments are all within a scope of the present invention. The specification and drawings are, accordingly, to be regarded in an illustrative rather than a restrictive sense.

What is claimed is:

1. A system to allow an analyst to analyze event streams of a user session and graphically display a result, the system comprising:
   at least one hardware-based processor having memory coupled thereto;
   a log file configured to interface to one or more log sessions from a user-generated event stream, the event stream being generated by various on-line states from the user session in a communication network;
   a query composer comprising a query language and a front-end filter coupled to the log file, the query composer configured to provide one or more conditions to sort the event stream;
   a graph visualizer coupled to the query composer and configured to produce a probability distribution of event nodes from a given node in the event stream, the graph visualizer being further configured to produce a graphical reduction of a produced graph by determining patterns in a graphical tree and unifying occurrences of the patterns, the graph visualizer further to
      compute a similarity threshold level to produce the graphical reduction,
      make a determination whether two or more sub-trees in different paths of the graphical tree each have a similarity threshold value greater than the similarity threshold level, and
      merge the two or more sub-trees having the similarity threshold value greater than the similarity threshold level into a single sub-tree; and
   a graph generator coupled to the query composer configured to apply the one or more conditions to the event stream and generate a graph file, the graph generator being further configured to generate at least two types of results from each query request provided including a first plurality of pages visited in the user session and a last plurality of pages visited in the user session.

2. The system of claim 1 wherein the probability distribution of event nodes includes nodes chronologically subsequent to a first node in the event stream.

3. The system of claim 1 wherein the probability distribution of event nodes includes nodes chronologically precedent to a last node in the event stream.

4. The system of claim 1 further comprising:
   a job monitor configured to perform at least one of monitoring a current status of a running job and managing a running job;
   a graph database coupled to the graph visualizer and configured to store the graph file.

5. The system of claim 1 wherein the graph visualizer further provides an interactive interface allowing the analyst to explore one or more user traversal paths within the event stream and display the one or more user traversal paths in a plurality of automaton formats.

6. The system of claim 1 wherein the graph visualizer is further configured to read time series data from the event stream.

7. The system of claim 1 wherein the graph visualizer is further configured to allow the analyst to expand or collapse a plurality of nodes in a generated graph.

8. The system of claim 1 wherein the graph visualizer is further configured to have an adjustable probability threshold.

9. The system of claim 1 wherein the graph visualizer is further configured to produce an interactive map of the probability distribution of event nodes and a reduced probabilistic graphical automaton.

10. A method to analyze event streams of a user session, the method comprising:
    logging, using one or more hardware-based processors, a plurality of events from an event stream, the event stream being generated by various on-line states from the user session in a communication network;
    receiving a set of conditions to sort the plurality of events;
    applying the set of conditions to the plurality of events;
    producing a probability distribution of event nodes from a given node in the event stream;
    producing a graphical reduction of a produced graph by determining patterns in a graphical tree and unifying occurrences of the patterns, the graphical reduction being produced by operations including
       computing a similarity threshold level,
       making a determination whether two or more sub-trees in different paths of the graphical tree each have a similarity threshold value greater than the similarity threshold level, and
       merging the two or more sub-trees having the similarity threshold value greater than the similarity threshold level into a single sub-tree;
    applying the one or more conditions to the event stream and generating a graph file; and
    generating at least two types of results from each query request provided including a first plurality of pages visited in the user session and a last plurality of pages visited in the user session.

11. The method of claim 10 wherein the producing the probability distribution of event nodes includes generating a probability distribution of nodes chronologically subsequent to a first node in the event stream.

12. The method of claim 11 further comprising generating a forward-looking graph from the generated probability distribution of nodes chronologically subsequent to a first node in the event stream.

13. The method of claim 10 wherein the producing the probability distribution of event nodes includes generating a distribution of nodes chronologically precedent to a last node in the event stream.

14. The method of claim 13 further comprising generating a backward-looking graph from the generated probability distribution of nodes chronologically precedent to a last node in the event stream.

15. The method of claim 10 further comprising proportionately relating a font size of a probability to a value of the probability.

16. The method of claim 10 wherein the logging is performed by listening to real-time user activity in a website.

17. The method of claim 10 further comprising producing a graphical usage pattern from the plurality of events.

18. The method of claim 10 further comprising: aggregating a plurality of event streams from a plurality of users; and detecting patterns within the plurality of event streams.

19. A system for allowing an analyst to analyze event streams of a user session and graphically display a result, the system comprising:
 a logging means for interfacing to one or more log sessions from a user-generated event stream, the event stream being generated by various on-line states from the user session in a communication network;
 a querying means for providing one or more conditions to sort the event stream;
 a visualizing means for producing a probability distribution of event nodes from a given node in the event stream;
 means for graphically reducing a produced graph by determining patterns in a graphical tree and unifying occurrences of the patterns including
  computing a similarity threshold level,
  making a determination whether two or more sub-trees in different paths of the graphical tree each have a similarity threshold value greater than the similarity threshold level, and
  merging the two or more sub-trees having the similarity threshold value greater than the similarity threshold level into a single sub-tree; and
 a graph generator coupled to the querying means configured to apply the one or more conditions to the event stream and generate a graph file, the graph generator being further configured to generate at least two types of results from each query request provided including a first plurality of pages visited in the user session and a last plurality of pages visited in the user session.

20. The system of claim 19 wherein the probability distribution of event nodes includes nodes chronologically subsequent to a first node in the event stream.

21. The system of claim 19 wherein the probability distribution of event nodes includes nodes chronologically precedent to a last node in the event stream.

22. A processor-readable storage medium having no transitory signals and storing instructions that, when executed by a processor, causes the processor to perform operations to analyze event streams of a user session, the operations comprising:
 logging a plurality of events from an event stream, the event stream being generated by various on-line states from the user session in a communication network;
 specifying conditions to sort the plurality of events;
 applying the conditions to the plurality of events;
 producing a probability distribution of event nodes from a given node in the event stream; and
 producing a graphical reduction of a produced graph by determining patterns in a graphical tree and unifying occurrences of the patterns, the graphical reduction being produced by operations including
  computing a similarity threshold level,
  making a determination whether two or more sub-trees in different paths of the graphical tree each have a similarity threshold value greater than the similarity threshold level, and
  merging the two or more sub-trees having the similarity threshold value greater than the similarity threshold level into a single sub-tree;
 applying the one or more conditions to the event stream and generating a graph file; and
 generating at least two types of results from each query request provided including a first plurality of pages visited in the user session and a last plurality of pages visited in the user session.

23. The processor-readable storage medium of claim 22 wherein the producing the probability distribution of event nodes includes generating a probability distribution of nodes chronologically subsequent to a first node in the event stream.

24. The processor-readable storage medium of claim 23 wherein the operations further comprise generating a forward-looking graph from the generated probability distribution of nodes chronologically subsequent to a first node in the event stream.

25. The processor-readable storage medium of claim 22 wherein the producing the probability distribution of event nodes includes generating a distribution of nodes chronologically precedent to a last node in the event stream.

26. The processor-readable storage medium of claim 25 wherein the operations further comprise generating a backward-looking graph from the generated probability distribution of nodes chronologically precedent to a last node in the event stream.

* * * * *

UNITED STATES PATENT AND TRADEMARK OFFICE
CERTIFICATE OF CORRECTION

PATENT NO. : 9,063,979 B2  
APPLICATION NO. : 12/263382  
DATED : June 23, 2015  
INVENTOR(S) : Chiu et al.

Page 1 of 1

It is certified that error appears in the above-identified patent and that said Letters Patent is hereby corrected as shown below:

Claims

In column 22, line 17, in Claim 4, after "job;", insert --and--, therefor

In column 23, line 23, in Claim 18, after "comprising:", insert --¶--, therefor

Signed and Sealed this  
Twenty-sixth Day of January, 2016

Michelle K. Lee  
*Director of the United States Patent and Trademark Office*